July 9, 1940.   F. GENECAND   2,207,401
IRON FITTING, PARTICULARLY FOR MOUNTAIN FOOTWEAR
Filed May 6, 1939

INVENTOR:
FELIX GENECAND
BY: Haseltine, Lake & Co.
ATTORNEYS

Patented July 9, 1940

2,207,401

UNITED STATES PATENT OFFICE 2,207,401

IRON-FITTING, PARTICULARLY FOR MOUNTAIN FOOTWEAR

Félix Genecand, Geneva, Switzerland, assignor to Tricouni Société Anonyme, Geneva, Switzerland, a corporation of Switzerland Application May 6, 1939, Serial No. 272,065 In Switzerland July 25, 1938

3 Claims. (Cl. 36—59)

This invention relates to an iron-fitting intended more particularly for mountain footwear. This iron-fitting is characterized in that, comprising a plate which is intended to be applied against one face of the object to be fitted and at least one tooth which is joined to said plate by brazing, the plate is made of a metal that cannot be hardened whereas the tooth is made of a metal that can be hardened.

The invention also relates to a particularly simple process of making an iron-fitting according to the invention. This process consists in assembling mechanically the teeth and the plate, in adding to the whole the necessary quantity of hard solder capable of effecting the brazing by ordinary heating, in causing the iron-fitting thus prepared to pass in a furnace, in heating it red-hot therein, in causing the complete fusion of the solder when it comes out of the furnace by means of an auxiliary source of heat and in dropping the iron-fitting thus assembled into the liquid intended to harden the teeth thereof.

The accompanying drawing shows a certain number of embodiments of an iron-fitting according to the invention, given by way of example, and likewise shows the preparation to which the iron-fitting is subjected before the assemblage thereof when the process claimed is carried out.

Figs. 1 to 5 show five different embodiments of the iron-fitting.

Figure 2:
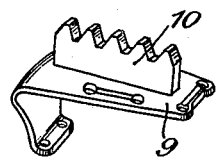
Figure 6:
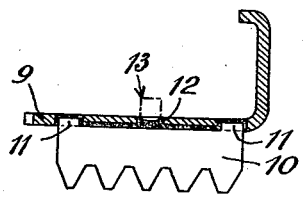

Fig. 6 relates to the process in the case when an iron-fitting is made according to Fig. 2.

Figure 7:
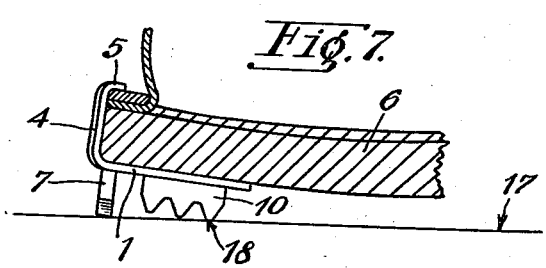

Fig. 7 shows an iron-fitting intended for footwear and fitted under the sole of a boot, seen in cross-section.

Figure 1:
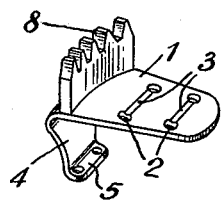

The iron-fitting according to Fig. 1 consists of a plate 1 made of mild steel comprising openings 2 and grooves 3 which are intended to receive the central part of a U shaped nail. Said plate comprises a part 4 which is bent down at right angles and which ends in a paw 5, the whole being intended to surround the edge of the sole of a shoe, as shown in Fig. 7, in which are seen the plate 1, the part 4 thereof and the paw 5 thereof in position of use on the edge of a sole 6. To the plate 1 is fixed by brazing a piece 7 which is provided with spikes 8 and which, taken as a whole, will hereinafter simply be referred to as "a tooth 7." Said tooth 7 is slightly incurved, so that it shall come and lodge along the edge of the sole and quite close to the latter.

The embodiment according to Fig. 2 is different from the preceding one in that, on a plate 9 which is slightly longer, there comes and lodges a tooth 10 which occupies a position perpendicular to that of the preceding example and which comes and lodges, consequently, radially with respect to the sole and once the iron-fitting is in place on a shoe.

Fig. 6 shows how to proceed in order to join the tooth 10 to the plate 9.

On the tooth 10 which is provided with gudgeons 11, is placed the plate 9 which is previously bored so as to be able to receive said gudgeons. Opposite the edge of the tooth, the plate 9 is bored with a supplementary hole 12, in which is put a small piece of solder 13, it being of course understood that hard solder will be used, which has already been combined with the flux necessary so as to be able to effect the brazing only by heating. When the iron-fitting has thus been prepared, it is made to pass in a furnace, so that the whole is heated red-hot, and this corresponds to a temperature at which the piece of solder 13 does not yet melt. As the solder is, however, very hot, it is only necessary to raise the temperature of same a little by means of an auxiliary source of heat, for instance by the flame of a blow-pipe, which is directed on the part to be brazed when it comes out of the furnace. Under the influence of the blow-pipe, the piece of solder then melts instantaneously and spreads by capillarity along interstices separating the tooth 10 from the plate 9. The dark portion of Fig. 6 shows the place of the solder once the piece 13 has melted. It is then only necessary to throw the iron-fitting thus assembled into water or oil to cause the hardening of those parts capable of being hardened, that is to say, in the present case, of the tooth 10.

It is clear that, in the case of very long teeth, more than one hole 12 could be provided in the plate and there could be more than one piece of solder, in the same way as it is evidently possible to secure at one and the same time, by brazing, several teeth to one single plate.

The work can be effected on a chain, by causing the iron-fittings to pass in the furnace, then in front of the flame of a blow-pipe suitably placed and finally to drop said iron-fittings into the liquid used for the hardening operation, for instance through the return of the chain which, by passing over a pulley, would get rid on the iron-fittings it carries.

Figure 3:
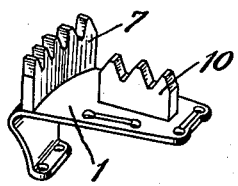
Figure 4:
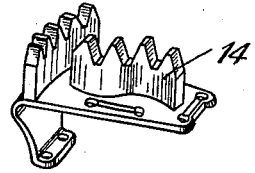

Figs. 3 and 4 show two embodiments of iron-fittings having more than one tooth, Fig. 3 showing a combination of the embodiments in Figs. 1 and 2, that is to say, a plate 1 comprising at one and the same time a tooth 7 which is intended to occupy a position tangent to the sole and a tooth 10 in radial position.

The embodiment according to Fig. 4 differs from that of Fig. 3, in that the radial tooth which is designated by the numeral 14 is not flat, but incurved and shaped like a very open S.

Figure 5:
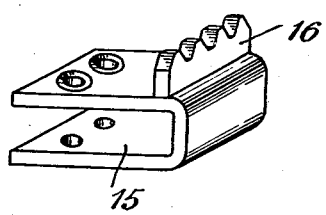

Fig. 5 relates to an iron-fitting capable for example of being fitted on the heel of a shoe, it being understood that said heel bears a kind of horse-shoe, round which the two arms of the plate 15, which are bent round in the shape of a U, are fitted, the lower arm with regard to the position shown being, moreover, capable of bearing against the heel. The plate 15 is likewise made of a metal which cannot be hardened and carries a tooth 16 made of a metal which can be hardened.

The advantage derived from the use of different metals for the different parts constituting the iron-fitting lies chiefly in the fact that it is possible to have a plate which is very malleable, which does not break when it is fitted on and which is, in addition, cheaper, and in the fact that it is possible to have one or more teeth made of a dearer metal and having quite special properties with regard to the hardening degree obtained. It is likewise possible to have a thin plate bearing one or several very thick teeth, that is to say teeth cut out from a sheet of thicker metal than the sheet serving to make the plate. This offers an advantage over the iron-fittings obtained, for example from one single metallic piece which is suitably bent but of which only those parts constituting the teeth can be hardened, said partly hardening operating being more difficult to execute and giving less satisfactory results.

Fig. 7 shows finally that it is useful, in the case of an embodiment like that in Fig. 3 for instance, to arrange for the teeth placed inside the sole of a shoe to be shorter than the tooth which comes on the edge. When walking, the sole 6 bends in fact, bulges and the plate 1 of the iron-fitting cannot therefore occupy a position parallel to the ground 17. It will slant in the way shown and, if all the teeth were of the same height, the shoe or boot would only touch the ground with the spike 18 of the tooth 10, the tooth 7 remaining in the air. By making the latter higher, it is possible for it likewise to touch the ground. The difference in height to be made up is moreover extremely small.

It is of course clearly to be understood that the shape which may be given to the plate and teeth, as well as the number and relative position of the latter, are not limited to the embodiments described and may be whatever desired.

What I claim is:

1. An iron-fitting, in particular for mountain footwear, comprising a plate with a part which is bent and intended to be applied to the edge of the sole of a boot or shoe, and at least one tooth located near said bent part, as well as at least one second tooth located on another point of the plate, the height of said second tooth being inferior to the height of the first mentioned tooth, both teeth being joined to said plate by brazing and the plate being made of a metal that cannot be hardened, whereas the teeth are made of a metal that can be hardened.

2. An iron-fitting, in particular for mountain footwear, comprising a plate intended to be applied against a surface of the object to be fitted with the iron-fitting, and at least one tooth having at least one gudgeon extending into a corresponding hole of the plate, which plate has at least one other hole formed opposite one of the edges of the tooth, said hole being at least partially filled with brazing metal in order to join the tooth to said plate by brazing, the plate being made of a metal that cannot be hardened, whereas the tooth is made of a metal that can be hardened.

3. An iron-fitting for boots and shoes and in particular for mountain footwear, comprising a metal plate having metal teeth brazed in position thereon, said plate consisting of a metal incapable of being hardened while said teeth consist of a metal capable of being hardened.

FÉLIX GENECAND.